US009251236B2

(12) United States Patent
Nair et al.

(10) Patent No.: US 9,251,236 B2
(45) Date of Patent: Feb. 2, 2016

(54) DOCUMENT SYNCHRONIZATION SOLUTION

(71) Applicant: INTERNATIONAL BUSINESS MACHINES CORPORATION, Armonk, NY (US)

(72) Inventors: Nisha K. Nair, Mountain View, CA (US); Dinesh K. Nirmal, San Jose, CA (US); Sandhya C. Turaga, San Jose, CA (US); David J. Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/144,251

(22) Filed: Dec. 30, 2013

(65) Prior Publication Data

US 2014/0114912 A1    Apr. 24, 2014

Related U.S. Application Data

(63) Continuation of application No. 12/033,156, filed on Feb. 19, 2008, now Pat. No. 8,650,154.

(51) Int. Cl.
*G06F 7/00* (2006.01)
*G06F 17/30* (2006.01)
*G06F 17/22* (2006.01)

(52) U.S. Cl.
CPC ...... *G06F 17/30581* (2013.01); *G06F 17/2288* (2013.01); *G06F 17/30011* (2013.01); *G06F 17/30873* (2013.01); *G06F 2216/15* (2013.01)

(58) Field of Classification Search
CPC ................ G06F 17/30575; G06F 17/30578; G06F 17/30011; G06F 17/2288; G06F 17/30873; G06F 2216/15; G06F 17/30581
USPC ............................ 707/610, 629, 635, 999.101
See application file for complete search history.

(56) References Cited

U.S. PATENT DOCUMENTS

| | | | |
|---|---|---|---|
| 5,404,488 A * | 4/1995 | Kerrigan et al. | 711/133 |
| 6,988,241 B1 | 1/2006 | Guttman et al. | |
| 7,233,951 B1 | 6/2007 | Gainer et al. | |
| 7,240,054 B2 | 7/2007 | Adiba et al. | |

(Continued)

OTHER PUBLICATIONS

Advisory Action 1, Feb. 22, 2011, for U.S. Appl. No. 12/098,706, filed Apr. 7, 2008 by Nisha K. Nair et al., Total 2 pp.

(Continued)

*Primary Examiner* — Mohammed R Uddin
(74) *Attorney, Agent, or Firm* — Janaki K. Davda; Konrad, Raynes, Davda & Victor LLP (57) ABSTRACT

A method for synchronizing a database with displayed data, includes providing a data feed to receive data from the database to provide displayed document data, detecting a database change to the data within the database by a database synchronizer to provide a change event, polling the database synchronizer using an HTTP message to detect the change event, and pushing the database change to the displayed document data to update the displayed document data in accordance with the database change and the polling. The polling includes long polling and short polling. A polling servlet within the database synchronizer performs the polling by the database synchronizer. The database synchronizer updates the displayed document data by way of a data structure. The data structure is a queue.

11 Claims, 5 Drawing Sheets

(56) References Cited

U.S. PATENT DOCUMENTS

| | | | |
|---|---|---|---|
| 7,467,198 B2 | 12/2008 | Goodman et al. | |
| 7,627,658 B2* | 12/2009 | Levett et al. | 709/223 |
| 7,676,562 B2 | 3/2010 | Reistad et al. | |
| 8,019,632 B2* | 9/2011 | Niheu et al. | 705/7.11 |
| 8,069,142 B2* | 11/2011 | Davis et al. | 707/610 |
| 8,560,956 B2* | 10/2013 | Curtis et al. | 715/763 |
| 2002/0129054 A1 | 9/2002 | Ferguson et al. | |
| 2002/0133509 A1* | 9/2002 | Johnston et al. | 707/203 |
| 2002/0138624 A1 | 9/2002 | Esenther | |
| 2003/0009563 A1 | 1/2003 | Douglis et al. | |
| 2003/0145021 A1 | 7/2003 | Parkkinen | |
| 2004/0015504 A1 | 1/2004 | Ahad et al. | |
| 2004/0068505 A1 | 4/2004 | Lee et al. | |
| 2004/0117439 A1 | 6/2004 | Levett et al. | |
| 2004/0148307 A1 | 7/2004 | Rempell | |
| 2004/0148375 A1 | 7/2004 | Levett et al. | |
| 2004/0148444 A1 | 7/2004 | Thomas et al. | |
| 2004/0179036 A1* | 9/2004 | Teplov et al. | 345/751 |
| 2004/0237045 A1 | 11/2004 | Meltzer | |
| 2005/0049945 A1 | 3/2005 | Bourbonnais et al. | |
| 2005/0055382 A1 | 3/2005 | Ferrat et al. | |
| 2005/0102310 A1 | 5/2005 | Marr et al. | |
| 2005/0188353 A1 | 8/2005 | Hasson et al. | |
| 2005/0228812 A1 | 10/2005 | Hansmann et al. | |
| 2005/0246395 A1 | 11/2005 | Sevilla | |
| 2005/0257132 A1 | 11/2005 | Karby | |
| 2005/0267921 A1 | 12/2005 | Bali et al. | |
| 2006/0004794 A1 | 1/2006 | Pizzo et al. | |
| 2006/0004923 A1 | 1/2006 | Cohen et al. | |
| 2006/0010165 A1 | 1/2006 | Gee | |
| 2006/0015817 A1 | 1/2006 | Fioretti et al. | |
| 2006/0015842 A1 | 1/2006 | DeSantis | |
| 2006/0041831 A1 | 2/2006 | Cho et al. | |
| 2006/0053425 A1 | 3/2006 | Berkman et al. | |
| 2006/0070019 A1 | 3/2006 | Vishnumurty et al. | |
| 2006/0167981 A1 | 7/2006 | Bansod et al. | |
| 2006/0218206 A1 | 9/2006 | Bourbonnais et al. | |
| 2006/0224634 A1 | 10/2006 | Hahn et al. | |
| 2006/0259523 A1 | 11/2006 | Wallis et al. | |
| 2006/0259957 A1* | 11/2006 | Tam et al. | 726/3 |
| 2006/0271510 A1 | 11/2006 | Harward et al. | |
| 2007/0022155 A1 | 1/2007 | Owens et al. | |
| 2007/0061393 A1* | 3/2007 | Moore | 709/201 |
| 2007/0088709 A1 | 4/2007 | Bailey et al. | |
| 2007/0100834 A1 | 5/2007 | Landry et al. | |
| 2007/0130177 A1 | 6/2007 | Schneider et al. | |
| 2007/0130541 A1 | 6/2007 | Louch et al. | |
| 2007/0157304 A1 | 7/2007 | Logan et al. | |
| 2007/0162504 A1 | 7/2007 | Chivukula et al. | |
| 2007/0174419 A1 | 7/2007 | O'Connell et al. | |
| 2007/0185935 A1 | 8/2007 | Olivieri et al. | |
| 2007/0208992 A1 | 9/2007 | Koren | |
| 2007/0233811 A1 | 10/2007 | Rochelle et al. | |
| 2008/0046437 A1 | 2/2008 | Wood | |
| 2008/0162507 A1* | 7/2008 | Papaioannou et al. | 707/100 |
| 2008/0183844 A1 | 7/2008 | Gavin et al. | |
| 2009/0043867 A1* | 2/2009 | Sharp et al. | 709/218 |
| 2009/0055464 A1 | 2/2009 | Multer et al. | |
| 2009/0070388 A1 | 3/2009 | Kolke et al. | |
| 2009/0106052 A1 | 4/2009 | Moldovan | |
| 2009/0112970 A1* | 4/2009 | Dawson et al. | 709/202 |
| 2009/0210459 A1 | 8/2009 | Nair et al. | |
| 2009/0254589 A1 | 10/2009 | Nair et al. | |
| 2014/0032780 A1* | 1/2014 | Swineford et al. | 709/233 |

OTHER PUBLICATIONS

Amendment 1, Oct. 26, 2010, for U.S. Appl. No. 12/098,706, filed Apr. 7, 2008 by Nisha K. Nair et al., Total 9 pp.

Amendment 2, Feb. 8, 2011, for U.S. Appl. No. 12/098,706, filed Apr. 7, 2008 by Nisha K. Nair et al., Total 9 pp.

Amendment 3, Jan. 23, 2012, for U.S. Appl. No. 12/098,706, filed Apr. 7, 2008 by Nisha K. Nair et al., Total 7 pp.

Final Office Action 1, Jan. 19, 2011, for U.S. Appl. No. 12/098,706, filed Apr. 7, 2008 by Nisha K. Nair et al., Total 33 pp.

Final Office Action 2, Mar. 27, 2012, for U.S. Appl. No. 12/098,706, filed Apr. 7, 2008 by Nisha K. Nair et al., Total 17 pp.

Office Action 1, Jul. 13, 2010, for U.S. Appl. No. 12/098,706, filed Apr. 7, 2008 by Nisha K. Nair et al., Total 30 pp.

Office Action 3, Sep. 23, 2011, for U.S. Appl. No. 12/098,706, filed Apr. 7, 2008 by Nisha K. Nair et al., Total 28 pp.

Amendment 4, Jul. 27, 2012, for U.S. Appl. No. 12/098,706, filed Apr. 7, 2008 by Nisha K. Nair et al., Total 8 pp.

Office Action 5, Sep. 28, 2012, for U.S. Appl. No. 12/098,706, filed Apr. 7, 2008 by Nisha K. Nair et al., Total 11 pp.

Amendment 5, Dec. 27, 2012, for U.S. Appl. No. 12/098,706, filed Apr. 7[Amend5 (57267)].

Amendment 6, Aug. 9, 2013, for U.S. Appl. No. 12/098,706, filed Apr. 7, 2008 by N.K. Nair et al., Total 10 pp.

Final Office Action 3, Apr. 11, 2013, for U.S. Appl. No. 12/098,706, filed Apr. 7, 2008 by N.K. Nair et al., Total 16 pp.

Notice of Allowance 1, Sep. 12, 2013, for U.S. Appl. No. 12/098,706, filed Sep. 12, 2013, Total 19 pp.

Haber, E.M., E. Kandogan, A. Cypher, P.P.Maglio, and R. Barrett—IBM Almaden Research Center, "A1: Spreadsheet-based Scripting for Developing Web Tools", 19th Large Installation System Administration Conference (LISA '05), pp. 197-208.

Office Action 1, May 26, 2010, for U.S. Appl. No. 12/033,156, filed Feb. 19, 2008 by N.K. Nair et al., Total 30 pp.

Amendment 1, Jul. 29, 2010, for U.S. Appl. No. 12/033,156, filed Feb. 19, 2008 by N.K. Nair et al., Total 13 pp.

Final Office Action 1, Oct. 13, 2010, for U.S. Appl. No. 12/033,156, filed Feb. 19, 2008 by N.K. Nair et al., Total 25 pp.

Amendment 2, Nov. 17, 2010, for U.S. Appl. No. 12/033,156, filed Feb. 19, 2008 by N.K. Nair et al., Total 9 pp.

Advisory Action, Dec. 3, 2010, for U.S. Appl. No. 12/033,156, filed Feb. 19, 2008 by N.K. Nair et al., Total 3 pp.

Office Action 3, Oct. 1, 2012, for U.S. Appl. No. 12/033,156, filed Feb. 19, 2008 by N.K. Nair et al., Total 16 pp.

Amendment 3, Jan. 16, 2013, for U.S. Appl. No. 12/033,156, filed Feb. 19, 2008 by N.K. Nair et al., Total 7 pp.

Final Office Action 2, May 6, 2013, for U.S. Appl. No. 12/033,156, filed Feb. 19, 20[57.266 (FOA2)].

Amendment 4, Aug. 5, 2013, for U.S. Appl. No. 12/033,156, filed Feb. 19, 2008 by N.K. Nair et al., Total 12 pp.

Notice of Allowance 1, Sep. 25, 2013, for U.S. Appl. No. 12/033,156, filed Feb. 19, 2008 by N.K. Nair et al., Total 25 pp.

Notice of Allowance 2, Jan. 6, 2014, for U.S. Appl. No. 12/098,706, filed Apr. 7, 2008 by N.K. Nair et al., Total 8 pp.

* cited by examiner

DOCUMENT SYNCHRONIZATION SOLUTION

CROSS-REFERENCE TO RELATED APPLICATION

This patent application is a continuation of U.S. patent application Ser. No. 12/033,156, filed Feb. 19, 2008, which patent application is incorporated herein by reference in its entirety.

BACKGROUND OF THE INVENTION

1. Field of Invention

This invention relates to the field of the synchronization of documents and, more particularly, the synchronization of a document displaying data stored in a database.

2. Description of Related Art

It is useful for multiple users, usually at geographically distributed locations, to work on the same document at the same time. In order to permit collaboration of this type, changes made to the document by one user should be displayed to all of the other users on their individual views of the document. Thus, the view of the users collaborating on the document at the same time can be constantly synchronized.

The data used to populate the document can be stored anywhere. Preferably, it can be stored in a database such as an IBM DB2 database. Alternately, data can be keyed or pasted into the document, or entered into the document in any manner available. If the data is stored in a database the user initiating a collaboration session can load the data from the database, populate the document, invite additional users to join the session and begin working collaboratively with the invited users. Additional users can be invited to access and/or request access during the collaboration session and be admitted while the session is in progress, typically by the initiating user.

It is known in the art to provide systems permitting such collaboration and synchronization of documents. For example, GOOGLE® provides GOOGLE® Docs to permit groups of users to synchronize document collaboration in this manner using the internet and their web browsers. The data represented in the synchronized document can be stored in a database prior to a collaboration session. A user can read the data from the database to populate the document at the time the collaboration session begins.

BRIEF SUMMARY OF THE INVENTION

A method for synchronizing a database with displayed data includes providing a data feed to receive data from the database to provide displayed document data, detecting a database change to the data within the database by a database synchronizer to provide a change event, polling the database synchronizer using an HTTP message to detect the change event, and pushing the database change to the displayed document data to update the displayed document data in accordance with the database change and the polling. The polling includes long polling and short polling. A polling servlet within the database synchronizer performs the polling by the database synchronizer. The database synchronizer updates the displayed document data by way of a data structure. The data structure is a queue.

A method for synchronizing a database with a collaboration document wherein a plurality of collaborating users make a plurality of collaboration changes to the collaboration document includes determining a collaboration change of the plurality of collaboration changes using an HTTP message to provide a determined collaboration change, pushing the determined collaboration change to the database, synchronizing the plurality of collaboration changes to provide a synchronized collaboration document, polling a database synchronizer to detect a database change to the data within the database to provide a change event, and pushing the change event to the synchronized collaboration document by the database synchronizer. The determined collaboration change is pushed by way of the data synchronizer. The change event is pushed by way of a data structure. The data structure is a queue.

BRIEF DESCRIPTION OF SEVERAL VIEWS OF THE DRAWINGS

Preferred embodiments of the invention will be described in conjunction with the following drawings in which like reference numerals designate like elements and wherein.

DETAILED DESCRIPTION OF THE INVENTION

Figure 1:
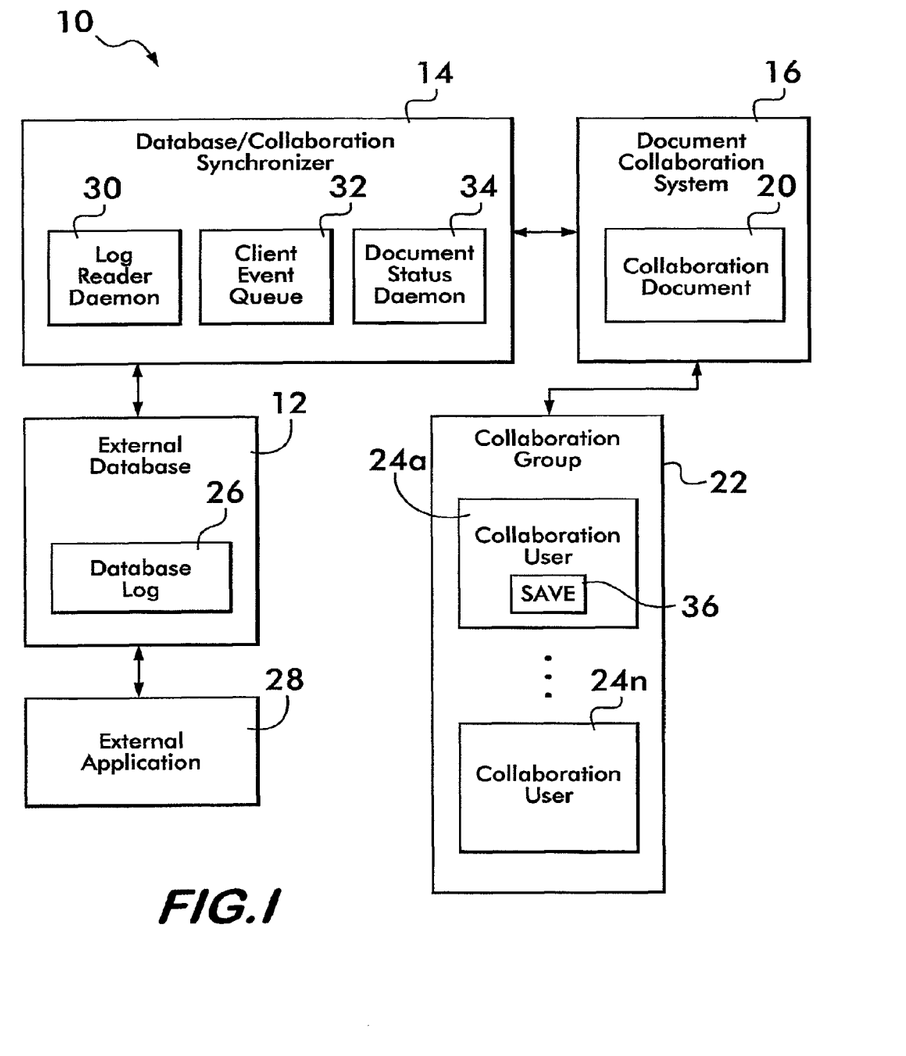
FIG. 1 is a block diagram overview of an embodiment of the document collaboration and synchronization solution.

Referring now to FIG. 1, there is shown an embodiment of document collaboration and synchronization solution 10. The document collaboration and synchronization solution 10 can access data stored in an external database 12, and display the accessed data as a collaboration document 20 in a document collaboration system 16. The document data comprising all or a portion of the collaboration document 20 can be transmitted from the external database 12 to the document collaboration system 16, by way of a database/collaboration synchronizer 14 having a client event queue 32.

The document collaboration system 16 can supervise the editing and synchronizing of the collaboration document 20 while the collaborating users 24a-n within a collaboration group 22 view and modify it. Thus, all of the collaborating users 24a-n of the collaboration group 22 can view a synchronized version of the collaboration document 20 during a collaboration session, within the document collaboration and synchronization solution 10. The collaborating users 24a-n can also save information they have changed during the collaboration session into the external database 12, by way of the database/collaboration synchronizer 14 during and/or after the collaboration session.

During a collaboration session an external application 28 can alter the data that is stored in the external database 12, while the document collaboration system 16 simultaneously displays the data as the collaboration document 20. The data of the collaboration document 20 can be displayed in a browser or in any other type of data display. Furthermore, the database/collaboration synchronizer 14 can detect the changes made by the external application 28 to the external database 12. Additionally, the database/collaboration synchronizer 14 can push the detected change events to the document collaboration system 16 during the collaboration session in order to update the collaboration document 20. The change events in the external database 12 can be propagated to the collaboration document 20 according to the URL of the collaboration document 20, the table names and the feednames of the data in the collaboration document 20, as described in more detail below.

In order to detect changes made to the external database 12 during a collaboration session, the database/collaboration synchronizer 14 can include a log reader daemon 30. The log reader daemon 30 can read a database log 26 within the external database 12. The database log 26 can keep track of all transactions involving changes to the data stored in the external database 12, including the data represented by the collaboration document 20.

Accordingly, the database/collaboration synchronizer 14 within the solution 10 can use the database log 26 and the log reader daemon 30 to detect changes to data stored in the external database 12 while the data is displayed in the collaboration document 20 within the document collaboration system 16. Furthermore, the database/collaboration synchronizer 14 can use the log reader daemon 30 to push the deleted change events to the collaboration document 20 during the collaboration session.

Thus, the collaborating users 24*a-n* can view and operate upon a collaboration document 20 that displays the changes made to the external database 12 during a collaboration session by the external application 28 on an on-going basis. Accordingly, the external application 28 can operate substantially like a virtual collaborating user 22*a-n* within the document collaboration and synchronization solution 10.

For example, the external database 12 can store the inventory information of a manufacturing company. The collaboration document 20 in the document collaboration system 16 can represent the inventory information as the inventory information is stored in the external database 12. The collaborating users 24*a-n* of the collaboration group 22 can be various groups within the manufacturing company that may need to use the inventory information. For example, the collaborating users 24*a-n* can be departments of the manufacturing company such as the accounting, marketing or sales departments. The external application 28 can be an application for updating the company inventory information stored in the external database 12 as the company manufactures new items and puts them into inventory, or as officials of the company remove items from the inventory.

Therefore, each of the collaborating users 24*a-n* in the various departments of the company can perform their operations upon a collaboration document 20 while viewing the most recent inventory information, as stored in the external database 12 and displayed in the collaboration document 20. Additionally, other external entities (not shown) similar to the external application 28 can view the most recent changes that are made by the departments of the company using the collaboration document 20. Such other entities can view the changes to the document 20 because the database/collaboration synchronizer 14 pushes the changes to the external database 12.

A collaborating user 24*a-n* of the collaboration group 22 can direct the database/collaboration synchronizer 14 to perform a save operation into the external database by way of the document collaboration system 16. In a preferred embodiment of the invention the ability to perform the save operation can be limited to the initiating user 24*a-n*. The collaborating user 24*a-n* performing the save operation can initiate it by depressing a save button 36. The save button 36 can be provided in the displays of the collaborating users 24*a-n*. In alternate embodiments, the save to the external database 12 can be performed by other functionalities including an event driven save or an automatic save functionality.

The database/collaboration synchronizer 14 can determine that the collaboration group 22 has requested a save operation by monitoring the document collaboration system 16 using the document status daemon 34. When the document status daemon 34 detects a request to save the collaboration document 20, the document status daemon 34 can receive the change from the collaboration group 22 and push it to the external database 12.

Thus, the data in the external database 12 is synchronized with the changes made to the collaboration document 20 by the collaborating users 24*a-n* of the requesting collaboration group 22. When the changes made by the collaboration group 22 are stored in the external database 12 in this manner they are recorded in the database log 26. Therefore, the changes made to the collaboration document 20 by the collaboration group 22 can be viewed by the external application 28, or any other applications that may be coupled to the external database 12.

Accordingly, in the foregoing manner, the document synchronization and collaboration solution 10 can maintain synchronization of the collaboration document 20 as viewed by the collaborating users 24*a-n* and the corresponding data in the external database 12. The database/collaboration synchronizer 14 can receive changes made to the collaboration document 20 by the collaboration group 22 and push them to the external database 12. Additionally, the database/collaboration synchronizer 14 can push changes made by the external application 28 to the document collaboration system 16. The document collaboration system 16 propagates the changes to the collaboration document 20 received from the database/collaboration synchronizer 14 to the collaborating users 24*a-n* of the collaboration group 22.

Figure 2:
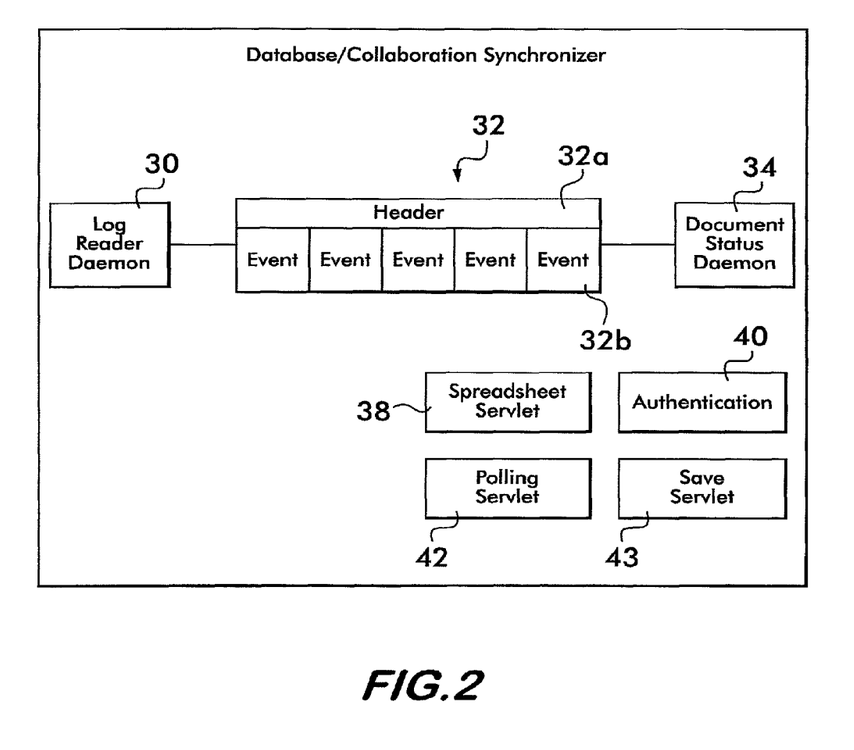
FIG. 2 is a more detailed block diagram representation of an embodiment of a database/collaboration synchronizer within the document collaboration and synchronization solution of FIG. 1.

Referring now to FIG. 2, there is shown a more detailed representation of an embodiment of the database/collaboration synchronizer 14 within the document collaboration and synchronization solution 10. The database/collaboration synchronizer 14 includes the client event queue 32 as previously described. The client event queue 32 can include a header 32*a* and an event list 32*b*.

The header 32*a* within the client event queue 32 can include information provided by the initiating user 24*a-n*, such as the feedname, the client IP address of the document collaboration system 16, and a document URL. The header 32*a* can also include any security token received during the initiation process, or the timestamp of the last time the document collaboration system 16 requested change event information from the database collaboration synchronizer 14. In a preferred embodiment of the invention the header 32*a* can indicate whether the client event queue 32 is a spreadsheet queue or a queue for some other type of collaboration document 20*a-n*. Furthermore, the header 32*a* can include any other information useful in facilitating the propagation of information between the external database 12 and the document collaboration system 16.

The event list 32*b* within the client event queue 32 can include an ordered list of the change events occurring within the external database 12 for the data displayed as the collaboration document 20 within the document collaboration system 16. Furthermore, the event list 32*b* can be empty if no change events are waiting to be pushed to the collaboration document 20.

The database/collaboration synchronizer 14 can create the client event queue 32 at the time an initiating user 24*a-n* registers for a collaboration session. In one embodiment of the invention, the initiating user 24*a-n* can provide the feedname corresponding to required document data when initiating a collaboration session, in order to obtain access to the document data when the user 24*a-n* is authenticated using the authentication block 40. The database/collaboration synchronizer 14 determines whether the feedname provided in this manner already exists within the client event queue 32. If the feedname does not exist in the client event queue 32 the synchronizer 14 can create a header 32 in the client event queue 32. The table name(s) corresponding to the feedname is previously defined in configuration data. The synchronizer 14 can then place the table name and feedname information into the client event queue 32. Thus, the manner in which the client event queue 32 stores these relationships permits the routing of changes through the database/collaboration synchronizer 14.

For example, the log reader daemon 30 can detect a change made to a table within the external database 12 that stores data displayed in the collaboration document 20. The database/collaboration synchronizer 14 can locate the table name of the changed table in the client event queue 32. The synchronizer 14 can thus use the corresponding feedname within the client event queue 32 to route the change made to the table in the external database 12 through to the collaboration document 20 within the document collaboration system 16. When the database/collaboration synchronizer 14 pushes the change event to the document collaboration system 16, it can delete the event from the client event queue 32.

In the preferred embodiment of the document collaboration and synchronization solution 10, the log reader daemon 30 can identify changes to the external database 12 by parsing the entries in the database log 26. The log entry information used by the log reader daemon 30 to extract the metadata from the database log 26 can include the table name and the type of update performed on the data. The table name can be translated into zero, one or more feednames based on the feeds provided by the initiating user 24*a-n* at the time of registration. The types of updates can include whether the change event is an insert, an update or a delete.

The metadata information extracted from the database log 26 by the log reader daemon 30 can include the primary key of the changed table, the number of columns in the changed table and the type of data contained in the columns. Each time the log reader daemon 30 parses the information within the database log 26 it can set a cursor to the point of the last entry in the database log 26 that is parsed. Thus, in a subsequent reading of the database log 26, the log reader daemon 30 can parse only the new log entries. When the log reader daemon 30 uses the cursor to find a new log entry, indicating a new change to the external database 12, it can translate the change event into a queue event and enter the queue event into the event list 32*b* of the client event queue 32 as previously described.

A queue event in the event list 32*b* can be represented as a data structure containing the key value of the changed row in the database table within the external database 12 that stores the corresponding data displayed in the collaboration document 20. The queue event data structure can also indicate whether the change is an insert, an update or a delete. Additionally, the queue event data structure can include summary field values. Alternate embodiments of the client event queue 32 can include detail columns or any other information useful for propagating information between the external database 12 and the collaboration document 20.

In a preferred embodiment of the solution 10 the log reader daemon 30 places into the client event queue 32 only changes made to data that is being displayed in the collaboration document 20. Thus, the log reader daemon 30 can act as a filter for filtering changes made to the external database 12 by the external application 28. The determination whether change data is to be displayed in the collaboration document 20 can be made according to the table name or feedname provided by the initiating user 24*a-n* at the beginning of the collaboration session.

When the log reader daemon 30 places a queue event into the client event queue 32, the document status daemon 34 can determine that the collaboration group 22 is waiting for the change. If the document status daemon 34 determines that the collaboration group 22 is waiting for the change, the database/collaboration synchronizer 14 can push the change from the client event queue 32 to the collaboration document 20 within the document collaboration system 16 immediately. If a collaboration group 22 is not waiting, the change can remain on the client event queue 32 until the polling servlet 42 receives a polling request. When the polling servlet 42 issues the polling request, the database/collaboration synchronizer 14 can push the change to the collaboration document 20. In either case, the document collaboration system 16 can then propagate the change to the collaborating users 24*a-n* within the collaboration group 22. Thus, in this manner, the external application 28 can operate substantially as a virtual collaborating user 22 by the document collaboration and synchronization solution 10.

Similarly, the database/collaboration synchronizer 14 can use the relationships specified in the client event queue 32 to push changes made to the collaboration document 20 from the document collaboration system 16 to the external database 12. When a collaborating user 24*a-n* presses the save button 36, the document collaboration system 16 can initiate an HTTP message. The HTTP message from the collaborating user 24*a-n* informs the document status daemon 34 of the save request. In one embodiment the database/collaboration synchronizer 14 can include the save servlet 43.

The document status daemon 34 locates the feedname corresponding to the changed collaboration document 20 in the client event queue 32. The database/collaboration synchronizer 14 can then determine the corresponding table name within the external database 12 using the relationships stored in the header 32*a* of the client event queue 32. The database/collaboration synchronizer 14 can then propagate the change from the collaboration document 20 to the external database 12 according to the corresponding table name indexed to the feedname by the client event queue 32. Accordingly, the document collaboration and synchronization solution 10 can extend an RSS feed with real time change data polling and notification to the external database 12. Additionally, the solution 10 can provide the ability to change the external database 12 according to an RSS client while the RSS client receives changes from the external database 12.

In a preferred embodiment, a collaboration user 24*a-n* can make an HTTP request to the polling servlet 42 to await changes from the external database 12. The HTTP request can be a long polling request wherein the request remains open until the log reader daemon 30 identifies a relevant change to the data in the external database 12 or the HTTP request times out. A collaborating user 24*a-n* or an administrator of the database/collaboration synchronizer 14 can configure a timeout length for the polling request. If the log reader daemon 30 identifies a change prior to the timeout and places a corresponding queue event in the event list 32b of the client event queue 32, the polling servlet 42 can respond to the HTTP request with the change data. The document collaboration system 16 can update the document data of the collaboration document 20 according to the polling results.

In an alternate embodiment of the invention, the polling process may use a standard polling request in which a collaboration user 24a-n periodically generates an HTTP request and the generated HTTP request does not remain open. This type of polling can be referred to as short polling. In the short polling embodiment, the polling servlet 42 maintains the address of the collaboration user 24a-n sending the HTTP request, and initiates an HTTP response to that user 24a-n when the client event queue 32 contains changes to the external database 12. If a short polling request arrives when the client event queue 32 has no changes for the collaboration group 22, the database/collaboration synchronizer 14 can send a negative response to the collaboration group 22.

Figure 3:
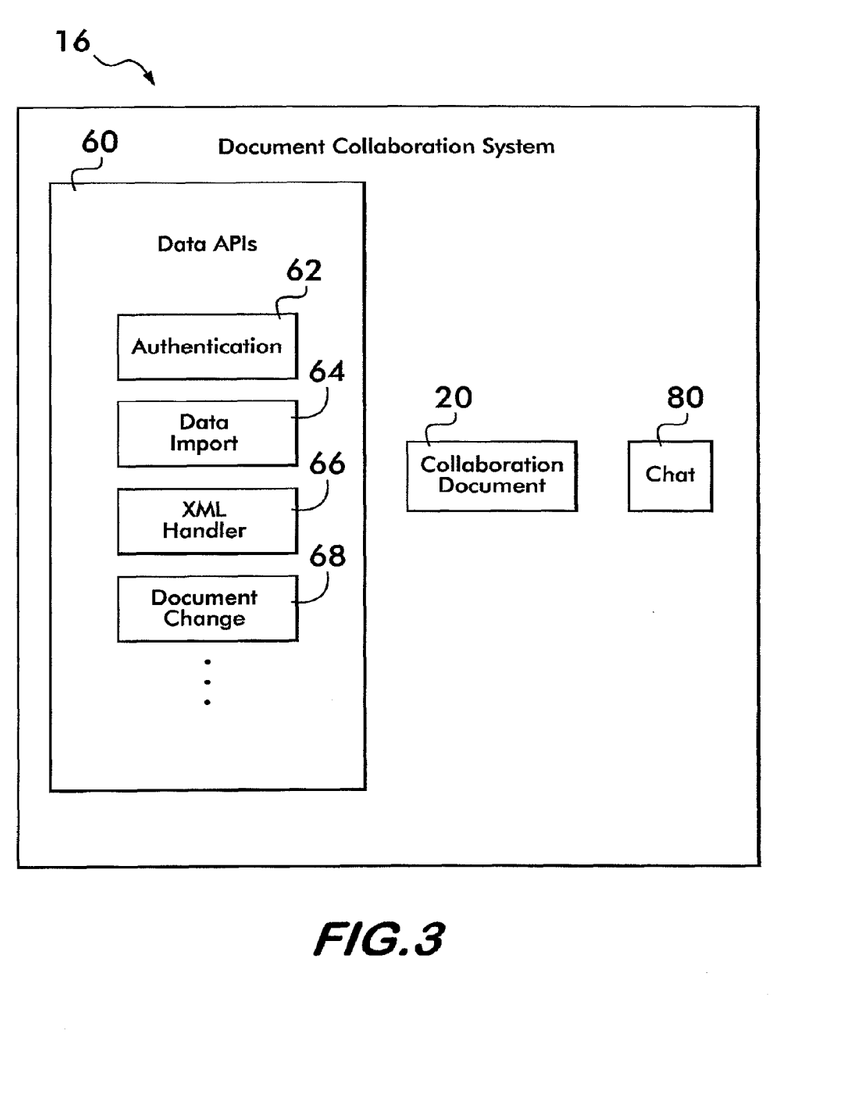
FIG. 3 is a more detailed block diagram representation of the embodiment of a document collaboration system of the document collaboration and synchronization solution of FIG. 1.

Referring now to FIG. 3, there is shown a more detailed block diagram representation of the document collaboration system 16 for permitting the collaborating users 24a-n to collaborate on a collaboration document 20. The collaboration document 20 can be a text document, a spreadsheet document, a form based html page document, or any other type of document. In a preferred embodiment of the document synchronization and collaboration solution 10, the document collaboration system 16 can be any system for synchronizing the changes made to any type of collaboration document 20 by the collaboration users 24a-n. For example, the document collaboration system 16 can be a system such as one of the application programs made available within the GOOGLE® Docs suite of applications. Accordingly, the document collaboration system 16 can be the web based spreadsheet GOOGLE® Spreadsheets. GOOGLE® Spreadsheets is similar in functionality to other known stand alone spreadsheet applications such as Microsoft Excel. The GOOGLE® Docs suite of applications is comparable to Microsoft Office.

The document collaboration system 16 can include the data application programming interfaces (APIs) 60 for use by programmers who create web based applications such as an application implementing the document collaboration and synchronization solution 10. Accordingly, the data APIs 60 are a software toolkit that can be used by the solution 10 to assist in the exchange of information between the database/collaboration synchronizer 14 and the document collaboration system 16. Within GOOGLE® Docs the data APIs 60 can be referred to as the GData APIs. Documentation for the GData APIs can be found at http://code.GOOGLE.com/apis/gdata/. Documentation for GOOGLE® Spreadsheet data API can be found at) http://code.GOOGLE.com/apis/spreadsheets/developers_guide_protocol.html#AuthSubHTTP.

The data APIs 60 within the document collaboration system 16 can include, for example, an authentication method 62 for use with the authentication block 40 in the synchronizer 14 when initiating a collaboration session. The authentication process can include providing the initiating user 24a-n with a security token for storage in the header 32a of the client event queue 32 when the initiating user 24a-n registers. As part of the registration process the initiating user 24a-n can also provide the URL and the feed for storage in the header 32a. The feed can include a feedname, a table name or a key range. Furthermore, a table may be defined to be part of zero, one or more feeds. The key range can be a low key, a high key or a list of keys. The feed can also include summary fields which can include one or more columns from the table.

The data APIs 60 can also include a data import method 64. The document status daemon 34 and the document collaboration system 16 can use the data import method 64, for example, in populating the collaboration document 20 with data from the external database 12. Additionally, the XML handler method 66 can format and transmit XML messages between the synchronizer 14 and the document collaboration system 16. For example, the document change method 68 can issue an HTTP message when a collaborating user 24a-n presses the save button 36 to signal a save servlet 43 within the synchronizer 14 that the user 24a-n has requested a save operation for saving a version of the collaboration document 20. The document status daemon 34 can receive the change from the document collaboration system 16 and push the changes made to the collaboration document 20 onto the client event queue 32 for propagation to the external database 12, in response to the HTTP messages issued by the document change message 68.

Furthermore, those skilled in the art will understand that any number of additional methods having any useful functionalities may be provided within the data APIs 60 of the document collaboration system 16. Additionally, those skilled in the art can revise a web server program implementing the document collaboration and synchronization solution 10 to make use of any additional APIs 60 provided in the document collaboration system 16 whenever they are available.

In one preferred embodiment of the invention, the data APIs 60 can use standards such as the Atom 1.0, the RSS 2.0 syndication formats and the Atom Publishing Protocol as understood by those skilled in the art. The feeds of the data APIs 60 can conform to and be extended in conformity to these standards. This permits application programmers to use standardized commands within a web based program implementing the solution 10 to push information to or pull information as required, thereby facilitating their work. Because the GData framework of GOOGLE® Docs can use standard HTTP and web syndication protocols, it is possible to transmit data requests and responses using traditional syndication aggregators/feed readers, JavaScript/AJAX based clients in a web browser, stand alone applications and various other systems. A programmer can use any programming language that allows sending of HTTP requests and handling of XML based responses for synchronization of collaboration document 20 and the external database 12 data to implement the solution 10.

The RSS feed names in the document collaboration and synchronization solution 10 are defined in configuration data that includes, for example, the table name or view name, the primary key columns used to uniquely identify a row of data, and the columns that are defined to be summary fields. Other columns can be considered to be detail data, an optional key range, or a filter predicate that restricts the feed definition to certain rows of the table or view.

The document collaboration system 16 can also provide a chat feature 80 for the collaboration users 24a-n. In order to allow the collaborating users 24a-n to access the chat feature 80, their displays can have a chat button for opening a chat window on their displays. Using the chat windows on their displays, the collaborating users 24a-n can see who else is collaborating on a collaboration document 20 during a collaboration session. Additionally, the collaborating users 24a-n can chat with the each other using the chat windows.

Figure 4:
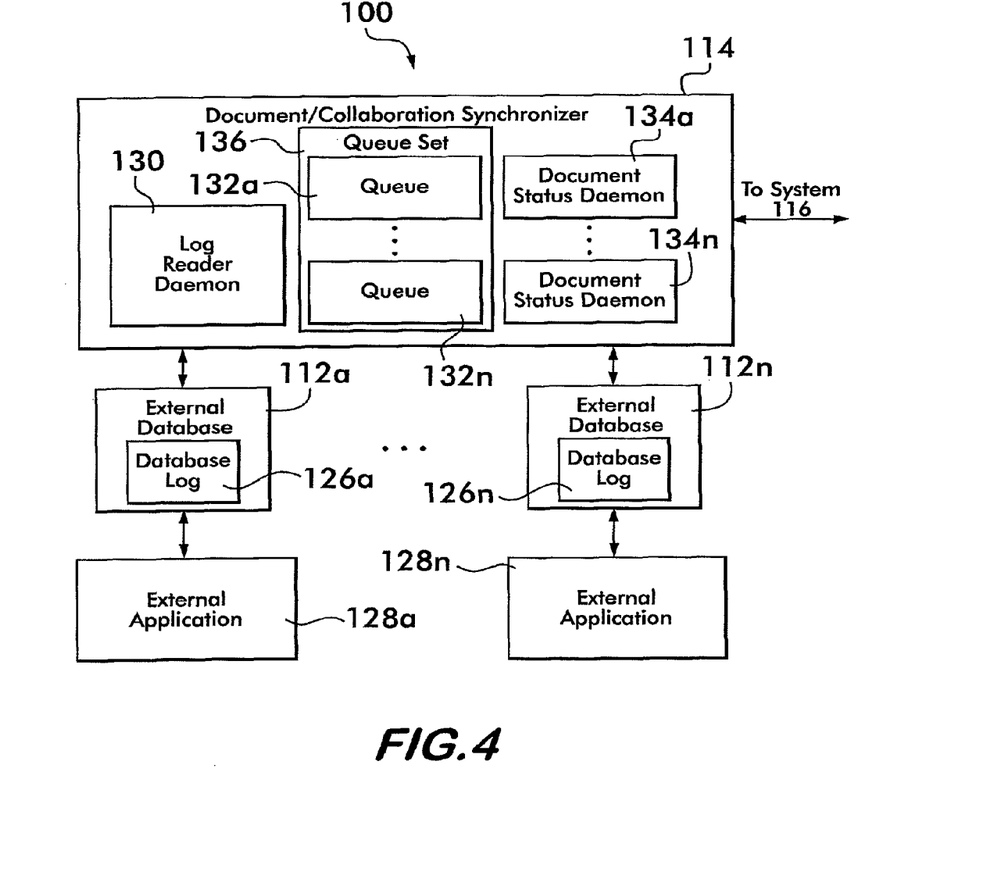
FIG. 4 is a block diagram representations of an alternate embodiment of the document collaboration and synchronization solution of FIG. 1 including synchronization of multiple collaboration documents.
Figure 5:
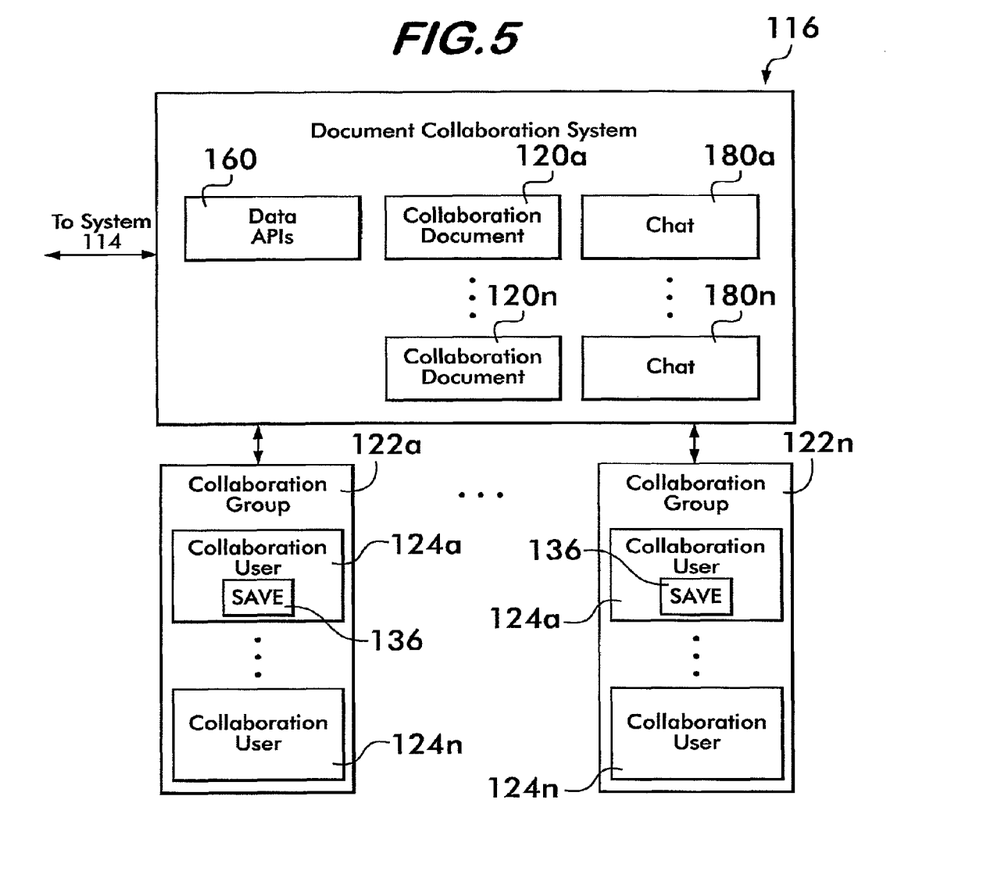
FIG. 5 is a block diagram representations of an alternate embodiment of the document collaboration and synchronization solution of FIG. 1 including synchronization of multiple collaboration documents.

Referring now to FIGS. 4, 5, there is shown an embodiment of the document collaboration and synchronization solution 100. The document collaboration and synchronization solution 100 is an alternate embodiment of the document collaboration and synchronization solution 10. Within the solution 100, multiple collaboration groups 122a-n can collaborate on their respective collaboration documents 120a-n during their respective collaboration sessions. The document collaboration system 116 within the solution 100 can individually supervise each of the collaboration groups 122a-n as previously described. In a preferred embodiment of the document collaboration and synchronization solution 100, the document/collaboration synchronizer 114 can synchronize multiple external databases 112a-n storing the data displayed in the collaboration documents 120a-n.

The document collaboration system 116 can supervise the editing and synchronizing of the collaboration document 120a as the collaborating users (not shown) within the collaboration group 120a view and modify it as previously described. Thus, all of the collaborating users within the collaboration group 122a can simultaneously view a synchronized version of the collaboration document 120a showing all of the changes made by the users during the collaboration session. Each of the collaboration groups 122a-n can have its own chat feature 180a-n for communication with the collaborating users therein.

Each collaboration document 120a-n in the solution 100 can have its own URL entered by the initiating user at the time of registration. The initiating user of each collaboration group 122a-n can start its document status daemon 134a-n within the document/collaboration synchronizer 114 for detecting changes in its collaboration document 120a-n at the time of registration. In an alternate embodiment (not shown) a single document status daemon 134a-n can detect the changes made to multiple collaboration documents 120a-n or to all of the collaboration documents 120a-n.

Each collaboration group 122a-n can also have its own client event queue 132a-n. Each client event queue can have its own header and its own event list. The client event queues 132a-n in the document/collaboration synchronizer 114 can form a queue set 136. The client event queues 132a-n within the queue set 136 can propagate changes made to each of the collaboration documents 120a-n, respectively, through to the external databases 112a-n. Additionally, the client event queues 132a-n can route changes made to the external databases 112a-n through to the corresponding collaboration documents 120a-n. The structure of the queue set 136 thus permits rapid lookups by the log daemon 130 and the polling servlet to facilitate propagation in both directions through the document/collaboration synchronizer 114. When the document collaboration and synchronization solution 100 begins operation, the queue set 136 can be empty. The first client event queue 132a-n can be created when an initiating user within the first collaboration group 122a-n registers. Thus, the size of the queue set 136 can increase or decrease as collaboration groups 122a-n log on, log off or time out.

Each client event queue 132a-n can begin in an empty state at the time of registration by its initiating user. The client event queue 132a-n maintains its header information regardless of the presence of events. The key <Feedname, address> can index the queue set 136. Nested java hash maps can implement the <Feedname, address>. In a preferred embodiment of the invention the outer hash map can be a hash map of [key=feedname, value=an inner hash map of [key=client address, value=queue header 32]]. In an alternate embodiment of the invention (not shown) the document collaboration and synchronization solution 100 can include a single events/client queue 132a-n for synchronizing the external databases 112a-n and the collaboration documents 120a-n.

The data APIs 160 within the document collaboration system 116 can detect a change made to a collaboration document 120a-n and generate an HTTP message containing the feednames to the changed collaboration document 120a-n accordingly. The corresponding document status daemons 134a-n can receive the HTTP message and place the change into the client event queue 132a-n of the changed collaboration document 120a-n. Using the information stored in the client event queue 132a-n, including the relationships between the table names and the feednames, the document/collaboration synchronizer 114 can determine the corresponding table or tables and transmit the change to the correct external database 112a-n or external databases 112a-n.

The log reader daemon 130 of the database/collaboration synchronizer 114 can read the records within the database logs 126a-n of any number of external databases 112a-n within the solution 100. Based on the names of the tables having changed data as indicated by the log records in the database logs 126a-n, the log reader daemon 130 can determine whether there are any feednames corresponding to the table in the queue set 136. Therefore, the log reader daemon 130 can determine whether any collaboration group 122a-n is waiting for the changed data. If any collaboration group 122a-n is waiting, the log reader daemon 130 creates a client event and pushes it onto the event list of the correct client event queue 132a-n.

Thus, when the log reader daemon 130 detects changes to the data in the external databases 112a-n it can push the changes to the collaboration documents 120a-n displaying the changed data according to the relationships stored in the client event queues 132a-n. In a preferred embodiment of the invention, a change which is pushed onto multiple client event queues 132a-n for multiple collaboration groups 122a-n can be saved as a single instance within the queue set 136. References to the single instance of the change can be provided for each client event queue 132a-n where the change is to be pushed. When the change is pushed to all of the collaboration groups 122a-n waiting for it, the synchronizer 114 can delete the instance.

Each external database 112a-n can have its own external application 128a-n for making changes to data stored within itself. Additionally, in a preferred embodiment of the invention, each external application 128a-n can view the data and make changes in any of the remaining external databases 112a-n. Furthermore, it will be understood by those skilled in the art that the external applications 112a-n can perform their operations upon the external databases 112a-n at any time, regardless of whether the collaboration groups 122a-n are actively collaborating upon any collaboration documents 120a-n.

While the invention has been described in detail and with reference to specific examples thereof, it will be apparent to one skilled in the art that various changes and modifications can be made therein without departing from the spirit and scope thereof.

What is claimed is:

1. A method, comprising:
providing a data feed associated with a collaboration document that is updated by an external database and a plurality of collaboration users, wherein the collaboration document is synchronized based on updates provided by the plurality of collaboration users and the external database;
storing a table name of a table of the external database that corresponds to a feed name of the data feed defined in configuration data, wherein the table name and the feed name are stored in a queue;
in response to detecting a database change to the table of the external database updated by an external application, locating the table name of the changed table in the queue;

using the table name of the changed table to identify the feed name of the data feed that is associated with the collaboration document; and pushing the database change to the collaboration document via the feed name for viewing by the plurality of collaboration users; and in response to detecting a collaboration change made by one of the plurality of collaboration users to the collaboration document, using the feed name of the data feed associated with the collaboration document to identify the table name of the table of the external database; and pushing the collaboration change to the table of the external database for viewing by the external application.

2. The method of claim 1, further comprising:

receiving an HTTP save message from the one of the plurality of collaboration users; and pushing the collaboration change to the external database in response to receiving the HTTP save message.

3. The method of claim 1, wherein the external database includes a database log for storing a record of the database change and further comprising:

reading the database log to detect the database change; and creating a change event in accordance with the reading of the database log.

4. The method of claim 1, further comprising:

creating a change event in accordance with the feed name.

5. The method of claim 1, further comprising:

polling to detect the database change, wherein the polling comprises one of long polling and short polling.

6. The method of claim 5, wherein an HTTP message remains open until one of a relevant change to the data in the external database is identified and the HTTP message times out in long polling.

7. The method of claim 6, wherein an HTTP message is generated by the one of the plurality of collaboration users and does not remain open in short polling.

8. The method of claim 1, further comprising:

polling a database synchronizer by a polling servlet of the database synchronizer.

9. The method of claim 1, further comprising:

updating the collaboration document using a data structure.

10. The method of claim 9, wherein the data structure comprises the queue.

11. The method of claim 1, further comprising:

displaying the collaboration document in a browser.

* * * * *